April 28, 1953
C. E. STARR, JR., ET AL
2,636,904
SYNTHESIS CONTROL PROCESS
Filed Feb. 28, 1950
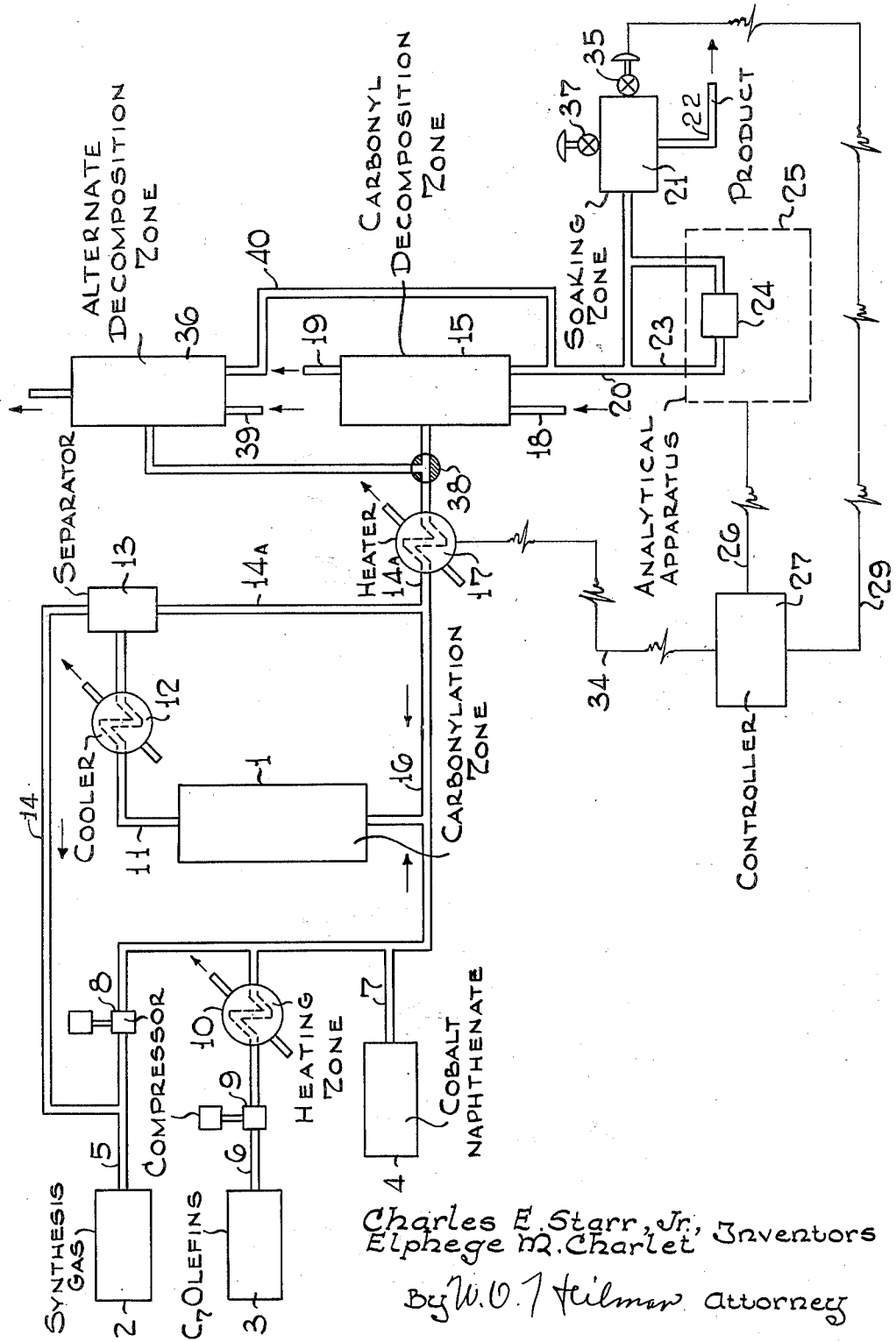
Charles E. Starr, Jr., Inventors
Elphege M. Charlet
By W.O.J Hilmer Attorney Patented Apr. 28, 1953

2,636,904

UNITED STATES PATENT OFFICE 2,636,904

SYNTHESIS CONTROL PROCESS

Charles E. Starr, Jr., and Elphege M. Charlet, Baton Rouge, La., assignors to Standard Oil Development Company, a corporation of Delaware Application February 28, 1950, Serial No. 146,896

1 Claim. (Cl. 260—604)

The present invention relates to an improved method of controlling a process for the preparation of oxygenated organic compounds by the reaction of olefinic compounds with hydrogen and carbon monoxide in the presence of a carbonylation catalyst. The invention is particularly concerned with a method of controlling the indicated process effective in obtaining a product suitable for use as a feed stock in the preparation of alcohols.

Processes are well known for synthesizing oxygenated organic compounds by the reaction of olefinic organic compounds, carbon monoxide, and hydrogen. Suitable catalysts to be used in such a process comprise salts of a catalytically active metal formed by reaction with high molecular weight organic acids. For example, such catalyst salts, or soaps, may be cobalt, or iron, oleate, stearate, naphthenate and the like. These salts are soluble in the liquid olefin feed and may be supplied to the carbonylation reactor dissolved in the feed in the form of a hydrocarbon solution. In the presence of the indicated catalyst, the olefinic hydrocarbons, carbon monoxide, and hydrogen react under pressure to yield a product consisting principally of aldehydes containing one more carbon atom than the olefinic material, together with secondary reaction products such as polymers, alcohols, esters, ketones, etc. This oxygenated organic mixture may be used as such in order to obtain aldehydes therefrom, or more frequently is employed as the feed stream to a further treating stage in which the aldehydes are hydrogenated to corresponding alcohols, or in which the aldehydes may be oxidized to corresponding carboxylic acids.

In the operation of the process heretofore described, the metal salt employed as a catalyst is substantially converted to a carbonyl compound during the carbonylation reaction. For example, in the case in which the carbonylation process employs a salt of cobalt, the products of the reaction will contain cobalt carbonyl. In addition, the carbonylation product will contain iron carbonyl formed from reaction with iron reactors. For many purposes it is desirable, and for particular purposes such as the subsequent hydrogenation of this product stream, it is essential, to remove the metal carbonyl compounds. This object may be accomplished by heating the carbonylation product stream at high temperatures, and if desired at high pressures, for a period of time so as to secure the decomposition of the metal carbonyl compounds. However, it has been found difficult to consistently secure complete decomposition of the metal carbonyls. As a result contamination of the final product with cobalt carbonyl and/or iron carbonyl frequently occurs.

It is, therefore, the principal object of this invention to provide an analytical method and a control process whereby metal carbonyl decomposition can be accurately, instantaneously, and continually determined and controlled so as to insure processing which will yield a metal carbonyl free product.

It is a further object of this invention to provide a commercially applicable control method for operating a carbonylation process so as to secure a metal carbonyl free product at maximum processing efficiency.

It is a more specific object of this invention to provide a control method whereby the practical exhaustion of a reactor for decomposing metal carbonyls may be determined.

To achieve the objects of this invention, at least a portion of the final product stream of the carbonylation process, after passing through a metal carbonyl decomposing zone, is passed through an infra-red transparent analytical cell. Infra-red energy of 5.0 microns and subsequently of 5.4 microns is passed through the analytical cell and through the carbonylation product contained in the cell. Infra-red energy of the indicated wave length which has passed through the cell is then caused to fall upon an infra-red energy detector developing an electrical signal. This electrical signal is then used to operate process controls associated with the metal carbonyl decomposing zone in a manner to eliminate all metal carbonyls from the final product.

The manner in which the indicated objectives of this invention, and the manner in which the briefly described method of this invention is carried out, may be more fully appreciated from the following complete description of a particular embodiment of this invention to be read in conjunction with the accompanying drawing diagrammatically illustrating a flow plan of a process embodying this invention. Referring to the drawing therefore, the numeral 1 represents a carbonylation reactor suitable for the reaction of olefins, carbon monoxide, and hydrogen in the presence of a catalyst such as cobalt naphthenate. Reactor 1 comprises a high pressure reaction vessel which may be either packed, or unpacked. Thus, if desired the reactor may be packed with any non-metallic packing material such as Raschig rings, porcelain pipes, ceramic material, pumice and the like. The necessary reactants may be withdrawn from storage zones or reactant sources indicated by the rectangles 2, 3 and 4. Thus synthesis gas consisting of hydrogen and carbon monoxide together with a small quantity of methane and carbon dioxide may be contained in zone 2 for introduction to reactor 1, through line 5. Similarly, zone 3 may consist of a storage zone for an olefinic composition such as a substantially pure composition consisting of $C_7$ olefins. The olefins may be withdrawn from zone 3 for introduction to zone 1 through line 6. Finally the catalyst to be employed, such as cobalt naphthenate, for example, may be maintained in zone 4 for addition to zone 1 through line 7. For this purpose it is preferred that the particular catalyst be maintained in solution in a soluble solvent such as liquid paraffins, or olefins, such as the $C_7$ olefins to be used in the carbonylation reaction. The stream of synthesis gas withdrawn from zone 2 and passed through line 5 are also passed through a gas compressor 8 operative to compress the synthesis gases to the presure at which zone 1 is to be operated. Similarly, the olefin feed passed through line 6 is compressed in compressor 9. The synthesis gas, and the olefin feed may be heated to carbonylation temperatures in any desired manner. For this purpose it is preferred to pass the olefin feed after compression and before admixture with the other reactants through a heating zone 10. This heating zone may simply consist of a fired coil operated so as to heat the olefin feed sufficiently high to provide all heating requirements of the carbonylation reaction.

The olefins used as reactants in the carbonylation reaction may consist of any olefinic hydrocarbons having one carbon atom less than the number of carbon atoms in the desired oxygenated product. Insofar as the synthesis gases are consumed at equivalent, or equimolar rates, synthesis gas components are usually added at equimolar proportions. If desired, however, and as disclosed by a recent patent, U. S. 2,437,600, an excess of hydrogen may be employed. The ratio of synthesis gas feed to olefin feed may vary widely but in general about 2500 to 25000 cubic feet of synthesis gas per barrel of olefin feed are employed. The catalyst is employed in weight percents of about 1 to 3%.

As indicated, therefore, the indicated reactants in the indicated proportions are brought into the reactor 1 to undergo the carbonylation reaction. The reactor is preferably operated at a pressure of 1500–4500 p. s. i. g., and at a temperature of about 250 to 450° F., depending upon the nature of the olefin feed, and other reaction conditions. The rate of flow of synthesis gases, and olefins through reactor 2 is so regulated that the desired conversion level of the olefinic material is obtained. A relatively long residence time in reactor 1, of the order of about two hours is required in the carbonylation stage. Somewhat higher throughput rates may be used to provide for a shorter residence period by employing high carbon monoxide partial pressure. Thus with a carbon monoxide partial pressure of 1500 to 2500 p. s. i. a shorter residence period may be employed. To achieve this object the hydrogen to carbon monoxide ratio may preferably be adjusted in the range of about 0.5 to 0.9.

The carbonylation reaction proceeds by virtue of the decomposition of the metallic salt, used as a catalyst, to a metal followed by the reaction of the metal with carbon monoxide to form the metal carbonyl which is the active form of the catalyst. Thereafter the metal carbonyl, such as cobalt carbonyl, catalyzes the reaction of olefins with carbon monoxide and hydrogen to form the desired aldehyde containing one more carbon atom than the corresponding olefin from which it is prepared. Particularly in the carbonylation reaction in which high partial pressures of carbon monoxide are maintained, substantial concentrations of cobalt carbonyl will be found in the effluent of reactor 1 withdrawn through line 11. Thus the product stream from reactor 1 carried from the reactor through line 11 will contain about 0.05 to 0.15 percent of cobalt carbonyl, or of the metal carbonyl formed from the particular catalyst used. In order to remove the metal carbonyl from the product stream the stream of line 11 is conducted to a metal carbonyl decomposition zone 15 wherein the reactor effluent may be heated at high temperatures and pressures for a period of time. Preferably the stream of line 11 is first conducted to a cooler 12 to secure condensation of all constituents of the effluent stream with the exception of unreacted synthesis gas. For this purpose this stream may be cooled to a temperature of about 90° F. in zone 12. Thereafter the stream may be conducted to a gas separator 13 operated to permit the removal of unreacted synthesis gas overhead through line 14 for recycle to reactor 1. The condensed liquid products are then removed from zone 13 through line 14A for introduction to the carbonyl decomposing zone 15. If desired, a portion of the liquid stream withdrawn from the bottom of zone 13 may be recycled to zone 1 through line 16.

As the metal carbonyl decomposing zone 15 is operated at a high temperature, it is preferred to pass the stream of line 14A through a preheater 17 prior to introduction to zone 15. Heater 17 may be operated to heat the stream to the desired decomposition temperature. Suitable temperatures may be chosen from the range of about 300 to 400° F., and suitable pressures for operation of zone 15 may be chosen from a range of about 15 to 200 lbs. p. s. i., although higher pressures may be used. It is believed that the indicated heating of the product stream containing the metal carbonyl is effective to decompose the metal carbonyl so as to permit free metal to plate out on interior surfaces of the decomposition zone. As an aid to this decomposition a stripping gas, such as a hydrogen containing gas or hydrogen may be introduced to the bottom of zone 15 through line 18 for removal at the top of the zone through line 19. This stripping gas is effective to strip and remove carbon monoxide resulting from the decomposition of the metal carbonyl. Consequently, the gas stream removed through line 19 comprises hydrogen and carbon monoxide. To provide available surface for decomposition of the metal resulting from the decomposition of the metal carbonyl, packing may be employed in zone 15.

The liquid carbonylation reaction product is maintained in zone 15 for a residence period of about 30 minutes. The carbonylation reaction product when withdrawn from zone 15 through line 20 is then substantially free of catalyst. Furthermore the product of line 20 is substantially free of any iron carbonyl which may have been formed from iron surfaces encountered in the preceding processing steps. It is preferred, however, to conduct the carbonylation reaction product of line 20 to an additional heating zone, or soaking zone 21 wherein additional time is provided for the decomposition of any metal carbonyls remaining. Thus zone 21 may be operated at temperatures of about 325° to 350° F. and pressures of about 150 p. s. i., to achieve this object. Thereafter the carbonylation reaction product is withdrawn from soaking zone 21 through line 22, for use as desired. As indicated, it is particularly contemplated that the carbonylation product be subjected to a subsequent hydrogenation treatment for the production of alcohols.

Heretofore the general process involved in the carbonylation reaction has been described. Insofar as this process is a conventional process, known to the art, no further identification of this process will be made.

In accordance with this invention the carbonylation process described is improved by a control method operative to best maintain effective operation of zones 15 and 21 wherein metal carbonyls are decomposed. Thus, it has been found that in the operation of the metal carbonyl decomposing zone 15, difficulties are frequently encountered due to incomplete decomposition of metal carbonyls. It is presently hypothesized that zone 15 may effectively be exhausted for further carbonyl decomposition when plating out of metals in zone 15 has reached a particular stage. Consequently, periods of successful operation of the decomposition zone are frequently and unexpectedly terminated so that metal carbonyls are no longer effectively decomposed in this zone. Heretofore it has been a difficult problem to determine when this stage of operation has been reached. Towards this end attempts have been made to analyze the stream of line 20 withdrawn from zone 15 so as to determine the metal carbonyl content of this stream. However, in withdrawing samples from line 20, and in transporting these samples to an analytical laboratory, and in conducting the necessary analysis it has been found that the metal carbonyls originally present at the time of sampling have decomposed. It is possible that the decomposition between the time of sampling and the actual analysis may be due to contact of the sample with the sampling container, may be due to the period of time involved, or may be due to other factors involved in sampling and transportation of the sample. In any case it has been found very difficult if not impossible to successfully withdraw samples from line 20 so as to permit their analysis for metal carbonyl content, according to conventional analysis methods. As a result, prior to the present invention operation of decomposition zone 15 could not be followed with certainty particularly so as to readily and immediately indicate any difficulties in the operation of zone 15.

In accordance with this invention, therefore, a bleeder line 23 is conducted from line 20 carrying a sample of the product of zone 15 continuously through an infra-red transparent cell 24. As will be brought out, by passing infrared energy of suitable wave length through this sample cell, and by detecting the transmitted energy using a bolometer, or equivalent device, an electrical signal may be obtained proportional to the concentration of metal carbonyl present in the stream. Thus as diagrammatically illustrated, unit 25 identified by the dashed line rectangle on the drawing, comprises an infra-red analysis apparatus operated to provide an electrical signal proportional to the metal carbonyl content of the stream of line 20. If desired, the output of element 25 may be used to control a recorder, or other indicating device to appraise an operator of the metal carbonyl content of the stream. Preferably, however, the electrical signal developed by element 25 is conducted through conductors 26 to an automatic control mechanism 27 suitable for operating a valve in conjunction with heater 17. Thus, the pneumatic or electrical lead 34 may control a valve which controls the amount of heat supplied by heater 17 to the stream of line 14A fed into zone 15. Alternatively, unit 27 may be used in a similar fashion to control the rate of flow of the products in line 14 into zone 15. The control apparatus is operated in such a manner that when metal carbonyl content is detected in the stream 20 by instrument 25, the product stream flowing through line 14 will be heated to a higher temperature; for example, the control apparatus may be operative to cause about a 5 or 10° increase in temperature in the stream entering zone 15. As a consequence of this change in feed stream temperature, carbonyl decomposition may be improved in zone 15 so as to permit obtaining a carbonyl free stream in line 20.

In a preferred adaptation of this process, controller 27 includes a voltage gate operative to send a further control signal through electrical or pneumatic lead 29 whenever the voltage developed by the control instrument 27 exceeds a particular value. For example, the voltage gate of unit 27 may be set so that when unit 17 had been caused to heat the input stream of line 15 by an increment of more than about 10° F., a signal will then be passed through line 29 operative to control a level control 35 associated with the soaking tank 21. By this means the time during which the carbonylation product is retained in soaking zone 21 may be increased.

As a further provision of the process of this invention when the level in soaking tank 21 has been increased to a maximum, by control of unit 27, provision is made to completely remove decomposing zone 15 from the process, and to employ an alternative decomposition zone 36. Thus, a float control 37 may be positioned in the upper part of zone 21 so that when the liquid level in zone 21 reaches the float, an electrical switch can be thrown which will close a solenoid valve or equivalent mechanism 38 in line 14 so as to pass the product of line 14 into zone 36. In a similar fashion other valves in the effluent lines from zone 15 and 36, and in the hydrogen input lines 18 and 39 may be operated so as to remove decomposing zone 15 from the process, and so as to employ decomposing zone 36. By this means it is possible to remove zone 15 from the treating process whenever the zone has become in such a condition as to no longer effectively decompose metal carbonyls. This zone may then be regenerated and reconditioned while zone 36 is being used in a similar manner.

In its broadest application, therefore, the present invention relates to the use of infra-red energy of a particular wave length to irradiate the stream, or a portion of the stream flowing through line 20. In accordance with the infra-red transmitting properties of this stream at the particular wave length employed, an infra-red detector of the apparatus 25 may be caused to provide an electrical signal proportional in magnitude to the metal carbonyl content of the product in line 20. In the preferred utilization of this electrical signal for control purposes, control apparatus is utilized responsive to the electrical signal so as to increase the temperature existing in zone 15 in order to increase the decomposition of metal carbonyl. As a second step of the control process, when the temperature of zone 15 has been changed by a given increment, for example 10° in this manner, a second control operation is initiated resulting in the increase in soaking time of the product passed through soaking zone 21. This is best achieved by increasing the level of the material maintained in zone 21. Finally as a third step of the control method when the level in zone 21 has reached a maximum, decomposition zone 15 is switched off stream and a fresh decomposition zone 36 is switched on stream. By the control method described, it has been found possible to achieve the greatest efficiency in metal carbonyl decomposition utilizing a given decomposition zone and associated soaking zone for the greatest practical length of time without possibility of contaminating the final carbonylation product with metal carbonyls.

As indicated, in the operation of this control method a critical wave length of infra-red energy must be employed. In the case in which the catalyst employed in the carbonylation reactor consists of iron carbonyl, the frequency which must be used is 5.0 microns. In the preferred case in which cobalt carbonyl is used as the catalyst, the infra-red energy must be 5.4 microns. These critical wave lengths have been found to be unique portions of the infra-red spectrum where infra-red transmission will solely be a function of iron or cobalt carbonyl concentration independent of the infra-red transmission characteristics of any of the other constituents present in stream 20. Thus, the composition of stream 20 while consisting principally of aldehydes having one carbon atom more than the initial olefin feed, will also contain alcohols, esters, ketones, hemi-acetals, acetals and unsaturated compounds. Insofar as each of these constituents have absorption bands in the infra-red spectrum, a complicated problem has existed in suitably identifying metal carbonyl content in the presence of these constituents. As indicated, however, it has been found that at infra-red wave lengths of 5.0 and 5.4 microns for iron and cobalt carbonyl respectively, infra-red transmission will be free of interference from the other infra-red adsorbing constituents of the stream.

Suitable control apparatus for use in the method described may be provided by those skilled in the art. Thus the infra-red analysis instrument 25 may consist of an infra-red source, a monochromator adjusted to transmit infra-red energy having a wave length of 5.0 or 5.4 microns, and an infra-red detector such as a thermocouple, or a bolometer, to develop an electrical signal proportional to the infra-red transmission through the sample cell of the apparatus. Alternatively, if desired, a conventional type of double beam infra-red control apparatus may be employed utilizing constituents in the cells of the apparatus so as to permit transmission of 5.0, or 5.4 micron infra-red energy. Control unit 27 operative to convert the electrical signal from element 25 to a control electrical signal or pneumatic signal may consist of conventional control apparatus such as a Brown electronic circular chart potentiometer, calibrated to a special range to meet conditions of application. Similarly, the electrically, or pneumatically controlled valves associated with heater 17, or positioned in line 14 are of conventional construction such as a Masoneilan diaphragm control valve, model 37. Finally, the level control associated with soaking zone 21 may be of the type such as a Brown Air-O-Line liquid level control.

What is claimed is:

In a carbonylation reaction process in which olefins, hydrogen and carbon monoxide are reacted to provide aldehydes in the presence of a cobalt catalyst and in which a cobalt carbonyl decomposing zone is provided, and in which a soaking tank is employed, the improvement which comprises passing the effluent of the said decomposition zone through an infra-red transparent cell, passing infra-red energy of 5.4 microns wave length through the said cell, impinging transmitted infra-red energy on an infra-red detector developing voltages proportional to the carbonyl content of the said effluent stream, said voltages having a first and second order of magnitude, increasing the extent of heating the said decomposition zone in response to voltages of the first magnitude, and increasing the level of material maintained in the soaking drum in response to voltages of the second magnitude.

CHARLES E. STARR, Jr.
ELPHEGE M. CHARLET.

References Cited in the file of this patent

UNITED STATES PATENTS

| Number | Name | Date |
| --- | --- | --- |
| 2,386,830 | Wright | Oct. 16, 1945 |
| 2,386,831 | Wright | Oct. 16, 1945 |
| 2,459,404 | Anderson, Jr. | Jan. 18, 1949 |
| 2,462,946 | Coggeshall et al. | Mar. 1, 1949 |
| 2,462,995 | Ritzmann | Mar. 1, 1949 |
| 2,504,682 | Harlan, Jr. | Apr. 18, 1950 |